Nov. 12, 1968  T. J. TWOMEY  3,411,121
INSULATED CLAMPING MEANS FOR LAMINATED MAGNETIC CORE
Filed June 27, 1967
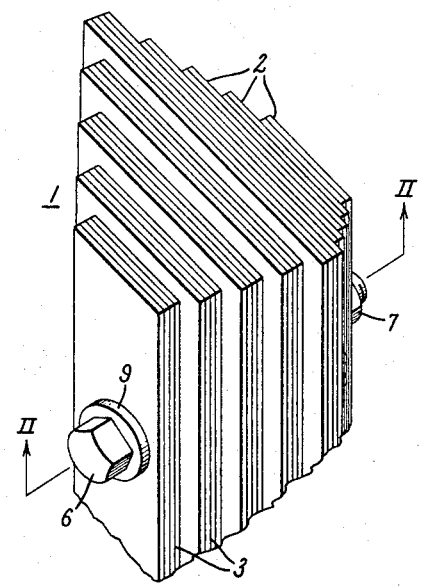
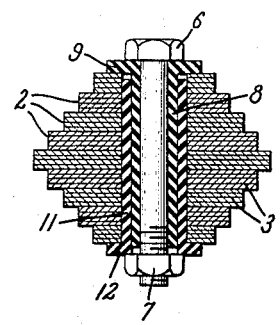
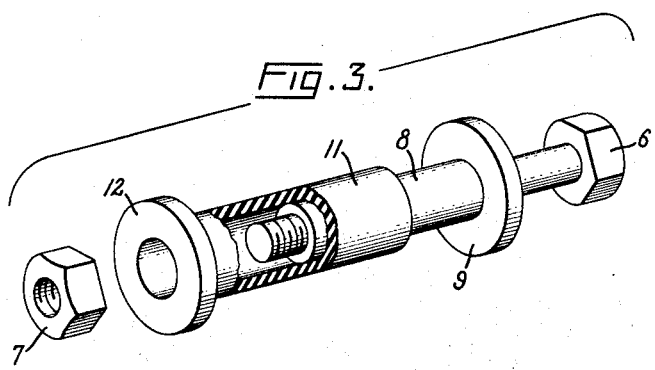
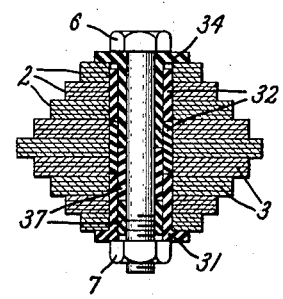
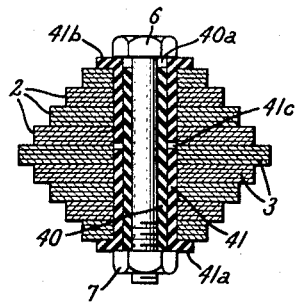
INVENTOR:
THOMAS J. TWOMEY,
BY
ATTORNEY

United States Patent Office 3,411,121
Patented Nov. 12, 1968

3,411,121
INSULATED CLAMPING MEANS FOR LAMINATED MAGNETIC CORE
Thomas J. Twomey, Rome, Ga., assignor to General Electric Company, a corporation of New York
Filed June 27, 1967, Ser. No. 649,159
6 Claims. (Cl. 336—210)

ABSTRACT OF THE DISCLOSURE

A laminated magnetic core wherein the insulation for bolts used to position and secure stacked laminations together is comprised of a pair of telescoping tubes surrounding each bolt, the cooperating tubes being self adjustable in lenth to accommodate variations in final compressed thickness of the core.

---

My invention relates to laminated magnetic cores for electric induction apparatus, and more particularly to improved insulated clamping means for securing together the stacked laminations of a core assembly.

The coils which comprise the windings for large electric induction apparatus, such as power transformers and the like, are frequently wound to form right circular cylinders. This configuration can more readily withstand radial short circuit forces and it maximizes the space enclosed by a coil turn of given length.

In power transformer design, the space within the coils which is available to accommodate the laminated core legs is considered quite valuable. This is because an increase in the core cross-sectional area means a decrease in the number of coil turns required and a resultant savings in conductor material, insulation and tank material may be effected. If the space is efficiently used, then, a given cross-sectional areas within the coil will accommodate a relatively large cross-sectional area of core laminations. In order to maximize core space usage, the core leg section is usually comprised of laminations of varying widths and takes a multi-step form roughly approximating a circle.

The laminations of large magnetic cores are usually kept in alignment and tightly compressed by means of bolts or studs passed through aligned holes in the laminations. These studs or bolts are ordinarily electrically insulated from the laminations by cylindrical tubes of insulating material. It is very difficult, however, to predict with precision the final compressed thickness of a laminated core. Because of variations in flatness and thickness of laminations, even the several leg and yoke portions of a single laminated core will frequently be of slightly different thickness when finally compressed. It is not possible, therefore, to predetermine with accuracy the desired length of an integral insulating tube for any one core bolt, much less to determine a single length suitable for all bolts of even the same core. If too long, a tube will be crushed when the bolt is drawn tight. If too short, the outer laminations will be beyond the tube and may shift into contact with the bolt.

In a prior known arrangement using insulating tubes of predetermined length, core thickness variation has been accommodated by providing thick insulating washers surrounding each end of the tube beyond the outer laminations and beneath the locking nuts. By cutting the insulating tube to a length slightly greater than the anticipated compressed thickness of the core plus the thickness of one washer, the tube can be made to project beyond both sides of the core and partly into each washer. To achieve this each washer must have a thickness twice as great as the practical extreme deviation in compressed core thickness. Such thick washers use valuable space which could otherwise accommodate additional core laminations. Also, in such construction the small gap within each washer and beyond the end of the insulating tube provides a space in which unwanted metal chips might accidentally bridge the space from stud to lamination. The cost of correcting this result can be extremely high since it oftentimes involves complete disassembly of the transformer.

One further problem encountered in the prior art is that the insulating tube is often severely scored as a result of its being used as a guide for laminations during the lay-up operation. It has been found that such scoring is often sufficient to impair the insulating capability of the insulating tube. In such a situation, the scored tube must be removed and a new tube inserted in its place. However, while it is sometimes possible to extract the scored tube for replacement after the core laminations have been assembled, imperfections in hole spacing and/or lamination misalignment, especially with laminations of varying widths, will usually preclude this remedy.

It is therefore a principal object of my invention to provide a laminated magnetic core for electric induction apparatus having a tubular core bolt insulator of self-adjusting length.

It is a further object of my invention to provide a tubular core bolt insulator for laminated magnetic cores which provides greater length of creep path between stud and laminations while also reducing the required thickness of end washers.

Still another object of my invention is the provision of a tubular core bolt insulator for laminated magnetic cores of such a design that scoring of the tube during lamination assembly is very markedly reduced.

In carrying out my invention in one preferred embodiment, I provide a pair of hollow cylindrical tubes in telescoping relation to each other. The tubes are disposed in a cylindrical aperture formed, for instance, from aligned holes in the individual laminations of a stacked magnetic core. By telescoping action, the tubes accommodate precisely to final core thickness. The inner cylindrical tube receives the core bolt which extends slightly beyond the stack surface for reception of a locking nut to secure the laminations. The tubes include outer annular flanges which cooperate with the tubes to effectively insulate the bolt and the locking nut from the laminations and preclude bridging therebetween by metal chips or deposits of fine powder originating from the laminations. Since all stacking of laminations is carried out on the outer tube, the inner tube is not scored or otherwise damaged in assembly. By segmenting the outer tube and adding to its length only as the stack builds up, such damage may be further minimized.

Other objects and advantages of my invention may be understood by reference to the following detailed description taken in conjunction with the accompanying drawings, in which:

FIG. 1 is a perspective view of a laminated magnetic core portion using the insulating tube arrangement of the present invention to insulate the core bolts;

FIG. 2 is a transverse cross-sectional view of the core portion taken along lines II—II of FIG. 1;

FIG. 3 is an exploded view of the insulating tube arrangement of the present invention; and FIGS. 4 and 5 are cross-sectional views of laminated cores each illustrating another embodiment of my invention.

Referring now to the drawings, I have shown at FIG. 1 an end portion of a typical transformer core leg 1 comprising a series of variable width lamination packets 2, the laminations 3 in each packet being of uniform width.

The resulting cruciform, a generally circular cross-sectional shape of the core 1 utilizes efficiently the space within a surrounding coil (not shown). While only a single core leg portion 1 is shown, the present invention may obviously be used with a core having a plurality of yoke and leg portions. A number of bolts or studs 6 are provided which span the laminations 3 transversely, each bolt being disposed in a cylindrical aperture formed from aligned holes in the individual laminations. Each bolt 6 is insulated from the laminations through which it passes by means of an insulating tube assembly illustrated at FIGS. 2 and 3. A locking nut 7 is provided which engages the threaded end of the bolt 6 to firmly secure the laminations.

The insulating tube arrangement of the present invention is best seen in FIGS. 2 and 3. This assembly comprises an inner hollow cylindrical tube 8 including an annular flanged portion 9 at one end thereof and an outer hollow cylindrical tube 11 having a flanged portion 12 at the other end thereof. The flanged tubes may be molded from an epoxy/glass fiber compound to insure adequate strength and abrasion resistance. The assembled tubes are in telescoping relation with their respective end flanges forming washers at opposite ends of the assembly. The shank of the bolt 6 is inserted through the tube assembly when the core 1 is fully assembled and ready for bolting together of the laminations.

The method of assembly of a core will now be described. The laminations are first stacked by using several aligned outer tubes 11 as a guide or jig. After the desired number of laminations are stacked on the outer tubes, the inner tube 8 is inserted into the central aperture of each outer tube 11 until the flanged portion 9 of the inner tube engages the top lamination of the stacked core. The bolt 6 is then inserted through the central aperture of each inner tube 8 and the locking nuts 7 are threaded onto the bolts and drawn up to the desired degree of tightness. It can now be observed that the tubes 8 and 11 and the integral annular flanges 9 and 12 therefore cooperate to completely insulate the bolt 6 and locking nut 7 so that no stray metal chips or deposits of fine metal powder can accidentally bridge between the bolt and the laminations. The long telescoping overlap of the tubes provides a long creep distance between the bolt and the laminations.

Since the two tubes are in telescoping relation to each other, each assembly accommodates itself individually to the final compressed core thickness at each bolt. Also, since the inner tube is not used as a jig in assembly, it is not abraded or otherwise damaged on its surface.

The present invention makes it possible to use most of the waste material which is ordinarily associated with stocking only one length of insulator tube when many different lengths may be needed. Any scrap ends remaining from tubes used for transformers having small core thicknesses may be used to increase the length of the insulating tubes for use on transformers having much larger core thicknesses.

At FIG. 4 I have illustrated an embodiment of my invention in which both the inner and the outer insulating tubes described above are segmented, i.e., formed of axially aligned tubular sections. In this modification a flanged outer tube 31 has several cylindrical sections 32 of equal tubular diameter axially aligned therewith to attain any desired total length. By adding these sections 32 on a temporary positioning stud as the core stacking progresses, the scoring damage to each section is minimized in the stacking operation.

At FIG. 4 the inner tube is also shown in segmented form, comprising a flanged portion 34 and several aligned cylindrical sections 37. One advantage of so segmenting the inner tube is that its sections may be added to the temporary positioning stud as the outer tube sections are added. In this way, possible difficulty may be avoided in attempting to insert a single long inner tube through a segmented outer tube whose sections may be slightly offset. It will of course be understood that, if desired, an integral inner tube may be used with a segmented outer tube. If both tubes are segmented, it is preferably done in such a way that the breaks in the two tubes are appreciably offset. In this way a solid support is always available for the stacked laminations, and a long creep path is ensured.

At FIG. 5 I have illustrated another embodiment of my invention similar to that of FIG. 4 but in which both end flanges are provided on the outer tube. At FIG. 5 the metallic parts corresponding to those shown at FIGS. 1–4 have been assigned the same reference numerals. In this FIG. 5 I have shown an integral and unflanged insulating sleeve 40 surrounding the bolt 6 and having such length that a gap 40a is assured between the sleeve 40 and the bolt head 6 (or nut 7) when the core laminations 3 are fully compressed. Surrounding the sleeve 40 there is slidably disposed a segmented insulating tube 41 having end flanges 41a and 41b at opposite ends thereof. To provide for adequate longitudinal adjustability, the segments of the tube 41 are so proportioned in length that a gap 41c therebetween is assured when the core laminations 3 are fully compressed. It will be understood that the flanged end segments of tube 41 are of such length that they necessarily overlie the inner tube end gap 40a and thus assure longitudinal offset of the gaps 40a and 41c. By this arrangement manufacturing expense is minimized for the reason that only one mold is required to form the necessary flanged tube parts.

It will of course be apparent to those skilled in the art that in the embodiment of FIG. 5 the inner sleeve or tube 40 may, if desired, also be segmented transversely. In addition, it will be evident that, if desired, end flanges may be formed on both outer segments of the inner tube as well as on both outer sections of the outer tube when both tubes are segmented. This later arrangement has the advantage that when outer tie bars parallel to the laminations 3 overlie the end flanges of the outer tube, the inner tube may be extended through the tie bars with its end flanges overlying the bars.

I have thus described an insulating arrangement for bolts utilized to hold together the laminations of a typical laminated magnetic core wherein an inner cylindrical tube and an outer cylindrical tube are disposed in a telescoping relation to each other, the tubes being disposed in a cylindrical aperture formed from aligned holes in the stacked laminations and having annular flanges forming washers at opposite ends.

While I have described a particular embodiment of my invention for the purpose of illustration, various modifications will occur to those skilled in the art. Accordingly, I intend in the appended claims to cover all such modifications as fall within the true spirit and scope of my invention.

What I claim as new and desire to secure by Letters Patent of the United States is:

1. In an electric induction apparatus, a laminated magnetic core formed of a plurality of laminations stacked together in flatwise engaging relation, a plurality of tie bolts extending transversely through aligned apertures in said laminations and compressing said laminations tightly together, the final compressed thickness of said core in the region of each said bolt being subject to unpredictable inequality, and insulating means for each said bolt comprising a pair of telescoping tubes of insulating material having flanged end portions forming insulating end washers, said flanged end portions being oppositely disposed to overlie opposite outer laminations of said core.

2. In an electric induction apparatus, a laminated magnetic core formed of a plurality of laminations stacked together in flatwise engaging relation, a plurality of tie bolts extending transversely through aligned apertures in said laminations and compressing said laminations tightly together, the final compressed thickness of said core in the region of each said bolt being subject to unpredictable inequality, and insulating means for each said bolt comprising a pair of telescoping tubes of insulating material each having one flanged end forming an insulating end washer, said flanged ends being oppositely disposed to overlie opposite outer laminations of said core.

3. An electric induction apparatus according to claim 2 wherein the outermost of said insulating tubes comprises a flanged end section and at least one axially aligned cylindrical section of equal tubular diameter.

4. An electric induction apparatus according to claim 3 wherein the innermost of said insulating tubes comprises a flanged end section and at least one axially aligned cylindrical section of equal tubular diameter, the axial sections of the inner and outer tubes being axially offset at their ends.

5. An electric induction apparatus according to claim 1 wherein the outermost of said insulating tubes is segmented transversely and includes a flanged end portion at each end thereof, the segments of said outer-most tube having a total axial length between said end portions less than the final compressed dimension of said laminations thereby to leave an annular gap in said outermost tube to provide lengthwise adjustability.

6. An electric induction apparatus according to claim 5 wherein the innermost of said insulating tubes has an axial length less than the final compressed dimension of said laminations.

References Cited

UNITED STATES PATENTS

| | | | |
|---|---|---|---|
| 1,353,711 | 9/1920 | Bergman | 336—210 X |
| 1,546,885 | 7/1925 | Burnham | 336—210 X |

LEWIS H. MYERS, *Primary Examiner.*

T. J. KOZMA, *Assistant Examiner.*